United States Patent Office 3,728,280
Patented Apr. 17, 1973

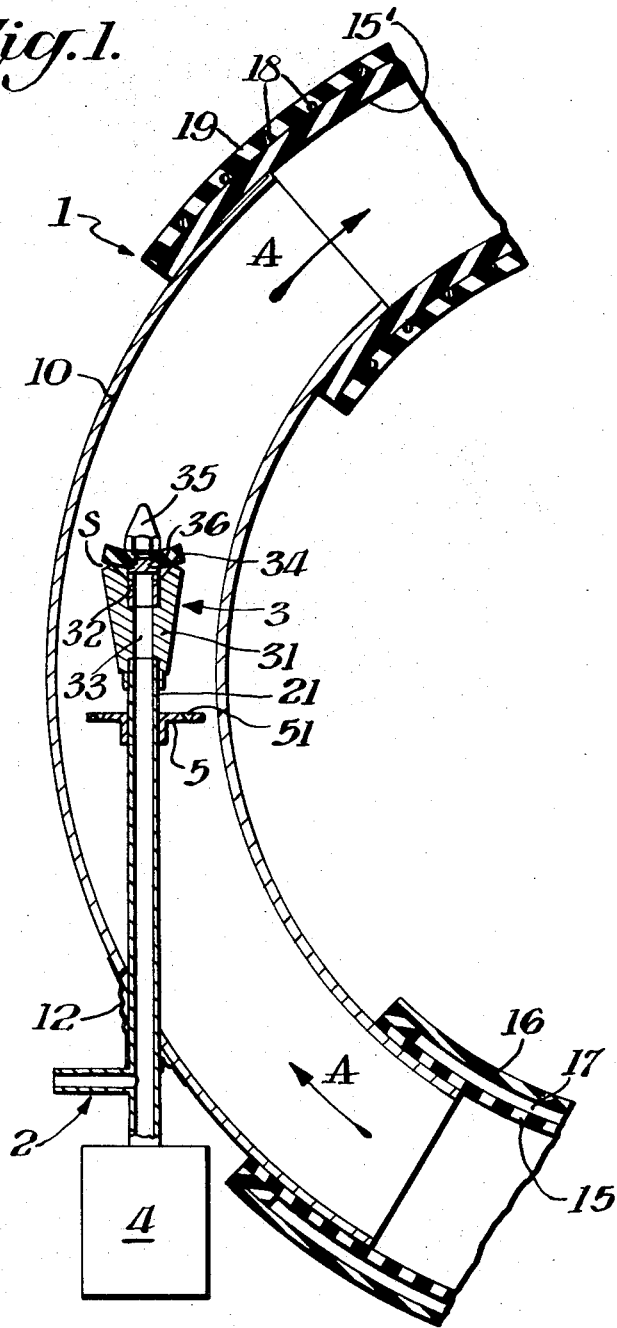
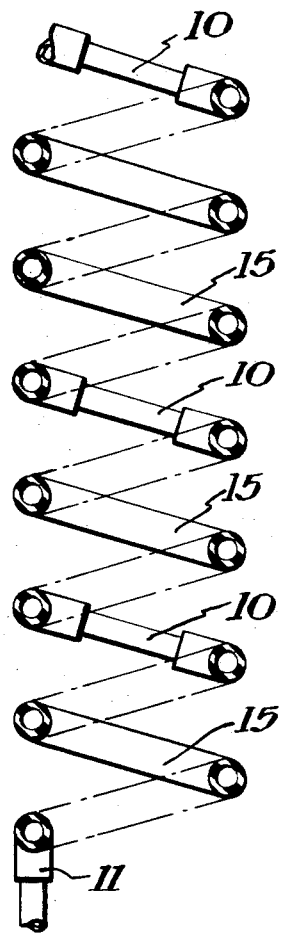

3,728,280
PROCESS AND A DEVICE FOR THE CONTINUOUS
PREPARATION OF EMULSIONS
Theo Sauer, Starnberg, and Dr. Gunter Schulz, Holzkirchen, Germany, assignors to Agfa-Gevaert Aktiengesellschaft, Leverkusen, Germany
Filed Feb. 16, 1971, Ser. No. 115,625
Claims priority, application Germany, Mar. 12, 1970,
P 20 11 667.0
Int. Cl. B01f 5/04; B01j 13/00
U.S. Cl. 252—314                                                11 Claims

ABSTRACT OF THE DISCLOSURE

Emulsions, such as suspensions containing silver halide, are prepared wherein the basic component and the resulting deposit are conducted in rising current. Further components are delivered into the basic component at sequentially arranged inlet points and are dispersed by means of the cross-current with the radially directed or pulsating cross-current being overlapped with oscillations directed in an axial direction to the tubular body in which the current flows.

BACKGROUND OF INVENTION

The invention relates to a process for the continuous preparation of emulsions or the like, particularly suspensions containing silver halide, wherein the basic component and later the resulting deposit, is conducted in rising current by means of dosing pumps or the like in a closed, tubular body made of several pipe sections, if necessary, wherein to the basic component there are delivered rotationally symmetrically in cross-current or in the pulsating cross-current one or several further components at inlet points arranged in sequence one after the other in the conveying direction, and the components are dispersed into each other by means of the cross-current, and wherein one or several further components may selectively or at the same time be delivered at one or more inlet points arranged in sequence one after the other in the conveying direction. Furthermore, the invention relates to the same process wherein, however, the resulting sediment is subjected to an additional mixing in at least one of the sections of the tubular body, situated between the inlet points, by means of one or several mixing elements swiveling in the axial direction of the tubular body-mixing disks with concentric borings, preferably conically expanded in the conveying direction. Furthermore a device for executing the process consists of a closed tubular body, composed as the case may be of several pipe sections, with inlet points arranged in sequence one after the other, wherein there is arranged one mixing nozzle valve per each inlet point with a circular slot, arranged in a plane perpendicular to the conveying direction, which is opened variably in its rotationally symmetric cross-section against the pressure of the spring pretension by the pressure affecting the particular components by means of the dosing pump or the like arranged thereto.

The already proposed process and its corresponding device for its execution, offers a multitude of advantages. Thus, there is achieved that neither air nor gas bubbles can occur by the convection per se, or by the delivery of the components, or by their dispersion. Since in the tubular body no mechanical elements, such as stirrers or the like, must be provided, the cross-sectional area of aperture of the tubular body may be kept relatively small resulting in further very considerable advantages. These advantages consist of a flow approximating the stopper flow ideally suited for this purpose, which often is also characterized in an obvious manner by the term "first in-first out." In other words, this means that all the finest droplets of the components or of the deposit delivered together to the tubular body pass through the tubular body and finally leave it together. By delivering the further components at the particular inlet points in reactive current, i.e. vertically to the flow direction of the basic component or of the resulting deposit, there is achieved a nearly complete mixing effect with an amount dispersed together becoming constantly relatively smaller. With a current so close to a stopper current and with the mixing effect achieved by means of the cross-current, there results a uniformly distributed reaction of the components in proportion of the course to the time over the entire mixture. With a pulsating cross-current, an increase of the mixing effect is achieved as a result of fine cross-layering. It is also possible to prepare mixtures with increasing concentration and as the case may be with the use of further provisions to have a corrective effect on the proceeding reaction. It should be emphasized that with equipment provided for the carrying out of the process, mixtures of very differing size, from bench test to large-scale production, may be prepared with a constant degree of effectiveness.

For producing the pulsation of the cross-current before the circular slot, closed by the force of spring pretension, a pressure is built up in the particular component which, upon reaching a certain level, overwhelms the force of the spring pretension and is reduced by the emergence of the components through the thus-opened circular slot until the circular slot is closed by the restoring force of the spring pretension in such a manner that the circular slot—with a corresponding adjustment of the pressure constantly produced by the dosing pump and the force of the spring pretension—is opened and closed in quick succession.

Finally, in the preparation of silver-halide-containing suspension, the quantity of individual components to be delivered to the inlet points and the temperature of a jacket heating of the tubular body and/or a heating device inserted after the tubular body in the conveying direction of the deposit may be controlled by means of one or several conductivity sensors, pAg-sensors and/or temperature sensors by means of respective control devices. By calling upon the particular sensors as the primary elements as well as standard sizes assumed to exist in the customary manner, by means of such a control loop, final control elements such as valves or even dosing pumps may thus be activated or adjusted so that a constant supervision of the course of the process is not required and on the other hand the uniformity of the continuously resulting deposit, the emulsion or the suspension is assured.

In an embodiment of the process, the resulting deposit is subjected to an additional mixing by means of mixing elements in the sections of the tubular body situated between the inlet points.

SUMMARY OF INVENTION

The object of the invention is to improve still more the advantages of the previously treated process; at the same time to form more advantageously the respective device.

In the initially described process, the problem is solved according to the invention first of all in that the radially directed cross-current or pulsating cross-current is overlapped with oscillations directed in the axial direction of the tubular body. By the oscillations of the cross-current, particularly of the pulsating cross-current, as a result of constant quick displacement of the very fine cross-layering of the delivered components in the basic component or the charge included in the formation, a particularly advantageous distribution of the components is achieved.

Unexpectedly, it has been found that an advantageous dispersion of the components is still achieved when in the initially described process of the invention, the radially directed cross-current or pulsating cross-current is affected and overlapped with the oscillations of one or more mixing elements, which should be accounted for solely due to the cooperation of the oscillations of the cross-current, here also particularly of the pulsating cross-current, and of the oscillations of the mixing disk.

The execution of the process according to the invention permits use of the above described type of device in that per each inlet point in the tubular body there is inserted—glandless and preferably sealed with a rubber membrane or the like—a supply pipe whose section pointing toward its opening is situated approximately coaxially to the tubular body and supports the corresponding mixing nozzle valve; and that at the inlet pipe outside the tubular body there is provided an oscillator for the bringing about of oscillations of the mixing nozzle valve, in axial direction of the tubular body, and consequently of the circular slot and of the cross-current or pulsating cross-current resulting therefrom; further in that at least one mixing element, a mixing disk with concentric borings preferably conically expanded in the conveying direction, is arranged at the section of the inlet pipe situated nearly coaxially to the tubular body. This design is distinguished by a simple, economical construction and great operating reliability, since reciprocally rotating elements or those gliding on each other are avoided.

A particularly advantageous, extensively space-saving design of the device consists, according to the invention, of having in a tubular body composed of several pipe sections at least one and preferably all of the pipe sections curved; of having the pipe sections consist partially of rigid bent pieces, partially of flexible, nearly hose-like pipe sections; and of having the inlet points arranged in the rigid bent pieces. This device may be constructed in an approximately mechanical assembly technique of a number of uniform—rigid and flexible—pipe sections according to the particular requirements of the process.

In a further development of the device, the mixing nozzle valves consist essentially of a valve body, suitably conically expanded outside from its connecting point at the inlet pipe to the circular slot, with an interior passage canal conically expanded toward the circular slot and a front flange surface representing one wall of the circular slot as well as a valve disk, springy or resilient per se, affected with spring pretension by deformed mounting and pressed on with pressure produced by spring pretension on the front flange surface of the valve body.

Finally, according to the invention, it is suggested that due to the heating of the pipe sections, the hose-shaped pipe sections for receiving a liquid heat exchange agent are preferably double-jacketed or are provided with an electrical jacket heating.

THE DRAWINGS

FIG. 1 is a cross-sectional view of a portion of a device in accordance with this invention; and FIG. 2 is a cross-sectional view in elevation of a portion of the device, composed of rigid and flexible pipe sections.

DETAILED DESCRIPTION

According to FIG. 1 and in FIG. 2, a device for the execution of the process schematically consists first of a closed, tubular body 1, which is composed of several bent pipe sections. More particularly body 1 is composed partly of rigid pipe sections 10, such as elbows, and partially of flexible, somewhat hose-like pipe sections 15, 15', such as hose sections, which at their connecting points are fitted one over the other or may be connected together permanently or releasably in any suitable manner. According to FIG. 1, due to the heating, the hose-like pipe sections 15 are provided with an outer jacket 16, forming a jacket canal 17 for receiving a liquid heat exchange agent, and the hose-like pipe sections 15' are provided with an electrical jacket heating 18 and are encased from outside with an insulating and heat dampening layer 19.

In each of the rigid pipe sections 10 there is situated an inlet point for one of the components, while the inlet point 11 (FIG. 2) is provided for the basic component at the lower end of the tubular body 1. As shown in FIG. 2, for each of the further components there may be provided one or more inlet points arranged in sequence one after the other which may be used selectively singly, in twos or in multiples, especially in order to achieve an increasing concentration of the charge. The use of mechanical assembly technique allows the fitting together of the rigid pipe sections 10 interchangeably with the hose-like pipe sections 15, 15', according to the requirements of the process, in a desired number and with desired intervals between the inlet points.

As shown in FIG. 1, per each inlet point in the tubular body 1, there is inserted in the rigid pipe section 10—glandless and sealed by means of a rubber membrane 12—a supply pipe 2 whose end section 21 pointing toward its outer opening is situated approximately coaxially to the rigid pipe section 10 of body 1. On section 21 there is situated a mixing nozzle valve 3 with a circular slot S placed in a plane perpendicular to the conveying direction A, which is opened variably in its rotationally symmetric cross-section against the pressure of the spring pretension by the pressure affecting the particular component by means of the here not illustrated dosing pump or the like arranged thereto. This nozzle valve is described with greater particularity in copending application Ser. No. 98,342, filed Dec. 15, 1970, and now U.S. Pat. No. 3,693,656, the details of which are incorporated herein by reference thereto. Outside the rigid pipe section 10 of tubular body 1 the supply pipe 2, is affected by an oscillator 4 for the bringing about of the oscillations of the mixing nozzle valve 3 and consequently of circular slot S situated in axial direction of tubular body 1, or more precisely of the rigid pipe section 10.

The mixing nozzle valve consists of a valve body 31, conically expanded outside from its connecting point at the supply pipe 2 or its section 21 to the circular slot S, with an interior passage canal 33, conducted through a charge 32, conically expanded toward the circular slot S and a front flange surface 34 representing one wall of the circular slot S as well as a valve disk 36, springy per se, affected with spring pretension by deformed mounting—by means of a somewhat torpedo-shaped cap nut 35 situated on a threaded section of insert 32—and pressed on with pressure produced by spring pretension on the front flange surface 34 of valve body 31, the valve disk being made of a resilient material accordingly.

The design of the circular slot S makes it possible to produce a cross-current or a pulsating cross-current of the component delivered at the inlet point in the basic component and later in the resulting charge; the pulsating cross-current, in connection with the oscillations situated in axial direction and brought about by oscillator 4, producing a particularly fine cross-layering and consequently a particularly homogeneous dispersion of the components.

In addition, on the supply pipe 2, more precisely on its nearly coaxially situated section 21, there is arranged a mixing element in the form of a mixing disk 5 with concentric borings 51 conically expanded in conveying direction A, so that the radially directed cross-current or pulsating cross-current from circular slot S is affected and overlapped with oscillations of the mixing disk 5. This produces, as it has been unexpectedly shown, an outstanding effect of the dispersion of the components.

What is claimed is:

1. A process for the continuous preparation of emulsions wherein the basic component and later the resulting deposit are conducted in rising current by means of dosing pumps in a closed tubular body made of at least one pipe section wherein to the basic component there are delivered rotationally symmetrically in cross-current at least one further component at inlet points arranged in sequence one after the other in the conveying direction, and the components are dispersed into each other by means of the cross-current, and wherein the further components are delivered at inlet points arranged in sequence one after the other in the conveying direction; and wherein the resulting deposit is subjected to an additional mixing in at least one of the sections of the tubular body situated between the inlet points by means of at least one mixing disk swiveling in the axial direction of the tubular body, characterized in that the cross-current is affected and overlapped with oscillations of at least one mixing disk.

2. The process of claim 1 wherein the emulsions are suspensions containing silver halide, the cross-current being radially directed, and the mixing disks having conically shaped openings arranged in its conveying direction.

3. The process of claim 1 wherein the emulsions are suspensions containing silver halide, the cross-current being pulsating, and the mixing disks having conically shaped openings arranged in its conveying direction.

4. A device for preparing emulsions consisting of a closed tubular body composed of a plurality of pipe sections with inlet points arranged in sequence one after the other, one mixing valve being provided for each inlet point, each mixing valve having a circular slot arranged in a plane perpendicular to the conveying direction, means for opening each slot in its rotationally symmetric cross-section against the pressure of the spring pretension by the pressure affecting the particular components by means of the dosing pump arranged thereto, characterized in that for each inlet point a supply pipe is provided in the tubular body with a sealed connection thereto, one of the mixing valves being mounted on the end of each supply tube in the tubular body, and oscillation means being connected to the supply pipe for causing oscillations in the axial direction of the tubular body and of the mixing valve and of its circular slot and of the cross-current resulting therefrom.

5. A device of claim 4 characterized in that a rubber membrane comprises the sealed connection of the supply tube to the tubular body.

6. A device of claim 5 characterized in that at least one mixing disk provided with concentric borings which are conically expanded in the conveying direction is mounted on a section of the supply pipe which is disposed substantially coaxially to the tubular body.

7. A device of claim 5 characterized in that in the tubular body is composed of a plurality of bent pipe sections, consisting partially of rigid elbow pipe sections and partially of flexible hose-like pipe sections, and the inlet points are arranged in the rigid pipe sections.

8. A device of claim 7 characterized in that the mixing nozzle valves consist of a valve body which is conically expanded outside from its connecting point to the supply pipe to the circular slot, the valve body having an interior passage canal conically expanded toward the circular slot, a front flange surface representing one wall of the circular slot, and a resilient valve disk affected with spring pretension by deformed mounting means for pressing the disk against the front flange surface of the valve body.

9. A device of claim 7 characterized in that heating means are provided for the pipe sections, the heating means being the hose-shaped disposed on the flexible pipe sections.

10. A device of claim 9 characterized in that the heating means is a jacket around a flexible pipe section with a liquid heat exchange agent therebetween.

11. A device of claim 9 characterized in that the heating means is an electrical jacket around a flexible pipe section.

References Cited
UNITED STATES PATENTS

| | | | |
|---|---|---|---|
| 1,246,003 | 11/1917 | Headley | 259—9 |
| 1,801,784 | 4/1931 | Schwartz | 252—314 X |
| 1,817,958 | 8/1931 | Zwilgmeyer | 252—314 X |
| 3,531,093 | 9/1970 | Karpacheva et al. | 259—98 X |
| 3,546,129 | 12/1970 | Berg et al. | 252—314 X |

RICHARD D. LOVERING, Primary Examiner

U.S. Cl. X.R.

252—359 R; 259—98, Dig. 30